United States Patent [19]

Zouhar

[11] 4,139,361

[45] Feb. 13, 1979

[54] APPARATUS FOR GLAZING BASES OF ELECTRIC BULBS

[75] Inventor: Otakar Zouhar, Nove Mesto nad Vahom, Czechoslovakia

[73] Assignee: Vyskumny ustav mechanizacie a automatizacie, Nove Mesto nad Vahom, Czechoslovakia

[21] Appl. No.: 829,154

[22] Filed: Aug. 30, 1977

[30] Foreign Application Priority Data

Aug. 30, 1976 [CS] Czechoslovakia .................. 5611/76

[51] Int. Cl.[2] ...................... C03C 27/02; C03B 23/20; H01J 9/06

[52] U.S. Cl. ........................................ 65/154; 65/155; 65/156; 65/164; 65/305; 65/323; 29/25.20

[58] Field of Search ................ 65/154, 156, 155, 164, 65/305, 323; 29/25.20

[56] References Cited

U.S. PATENT DOCUMENTS

| | | | |
|---|---|---|---|
| 2,486,085 | 10/1944 | Whitmore et al. | 65/154 X |
| 2,887,825 | 5/1959 | Spaller | 65/154 X |
| 2,957,276 | 10/1960 | Spaller | 65/154 |

*Primary Examiner*—S. Leon Bashore
*Assistant Examiner*—Frank W. Miga

[57] ABSTRACT

Apparatus for glazing bases of electric bulbs comprising a number of combined tools on the circumference of a continuously rotating rotor, the combined tools consisting of coaxially arranged upper and lower parts, a mold being formed by the lower part. The apparatus includes means for feeding molten glass and for pressing it by the upper part, means for checking the presence of base sleeves and contacts at the working station, and means for removing excess glass in the course of the pressing operation. The apparatus includes means for ejecting a sleeve from the lower part of any tool which does not contain a contact, and means for preventing the feeding of glass to any tool which does not contain a sleeve.

10 Claims, 19 Drawing Figures

B
B
84
1
7
8
5
4
87
9
11
10
6
12
17
13
18
14
46
56
54
59
64
88
15
47
19
49
23
50
51
25
27
24
26
28
20
16
52
22
113
33
32
30
31
29
35
37
39
29'
38
34
43
44
41
40
53
108
45
42
3
1
2

APPARATUS FOR GLAZING BASES OF ELECTRIC BULBS

BACKGROUND OF THE INVENTION

This invention relates to an apparatus for the glazing of bases of electric bulbs on a continuously rotating rotor.

The assembling of bases of electric bulbs is generally performed on automatic glazing devices, which now have an output of 30 to 200 pieces per minute. These machines are usually designed on the principle of an intermittently rotating table. With similar arrangements outputs of 150 pieces per minute are achieved at the maximum.

Arrangements with a continuous movement of the rotor with 48 rotating working sections are also known. So far, radial supports of considerable weight are used for this arrangement, the supports being urged from the center of the rotor by springs. The output of this machine is limited by the action of centrifugal forces to about 360 pieces per minute.

The drawbacks of these arrangements are primarily that due to the time sequence of different operations the performance of one operation affects all working stations of one sector of a revolution, and except for this sector these working stations are not utilized, thus increasing the investment costs of the arrangement. In addition, accuracy is lost due to wear of components, and the maintenance of the apparatus becomes costly.

SUMMARY OF THE INVENTION

It is an object of this invention to provide an apparatus for the glazing of bases of electric bulbs the rotor of which continuously moves, thus yielding high outputs, such apparatus, however, retaining the advantages of intermittently rotating arrangements, namely, their simplicity and economical manufacture.

The apparatus according to this invention has a combined tool composed of coaxial upper and lower parts, the upper part thereof having a support for a glazing needle supported within a sliding element and provided at the top with a shoulder, the glazing needle being encompassed by a pressure spring. The upper end of the pressure spring rests against the sliding element, the lower part abuts against a collar of the glazing needle. The sliding element is provided on its outside with an upper roller, there being a punch with a lower roller, said rollers cooperating with a double-sided cam fixed to a fixed shaft, the rollers being urged into engagement with the cam by a pressure spring. A fixed bearing is supported in the rotor at the location of a recess for the punch. A feeler with stops and with a guiding extension is situated below this bearing, and rests against a control bar situated in the lower part of the combined tool.

The lower part of the combined tool is composed of a rear part of the mold provided with a control bar cooperating with a front part of the mold, the parting plane between mold parts lying on the axis of an upper stud which guides them. The upper part of the upper stud forms the bottom of the mold and is provided in its center with a collar engaging into the cavity in the front part of the mold, the bottom part of the upper stud resting against a tubular extension or tube encompassed by a spring. The front part of the mold is provided on its external or radially outer side with a roller, such roller bearing on a cam fixed to the frame of the machine. The upper stud is sprung by an internal spring with respect to a lower stud provided with a circumferential cage, the lower stud being supported in the lower part of the tubular extension which passes in its lower part through a recess in the rotor, the cage together with a cone and balls forming a ball catch.

The circumferential cage is urged upwards by a coil tension spring fixed at its other end on the rotor and having an external extension cooperating with a dent of a rocking pawl supported on a pivot pin and urged by a spring against a lower fixed cam. The rotor has on its external upper part a reverse cone or funnel with a glass supply at the location of the combined tool, the glass supply being formed by a fixed chute at the location of the supply of a glass stream. The fixed chute is provided with a stationary knife, the rotor being provided with a rotating edge. The bearing can be provided with a protecting tube with a channel at the place of the supply opening of the feeler which is slidably mounted on the tube in which the punch is slidably arranged.

The advantage of this arrangement for the glazing of bases of electric bulbs is that by distribution of the working stations it comes close to arrangements with a rotor with intermittent movement while maintaining their simplicity and low manufacturing costs, whereby it is in continuous movement and thus is capable of a high output. It is capable of outputs of 400 pieces per minute up to the limiting factors of uniform glass melting and of the supplies of the respective components to be incorporated in the bulbs.

DESCRIPTION OF THE DRAWINGS

An examplary embodiment of an apparatus for the glazing of bases of electric bulbs is shown in the attached drawings, wherein.

DESCRIPTION OF A PREFERRED EMBODIMENT

Figure 1:
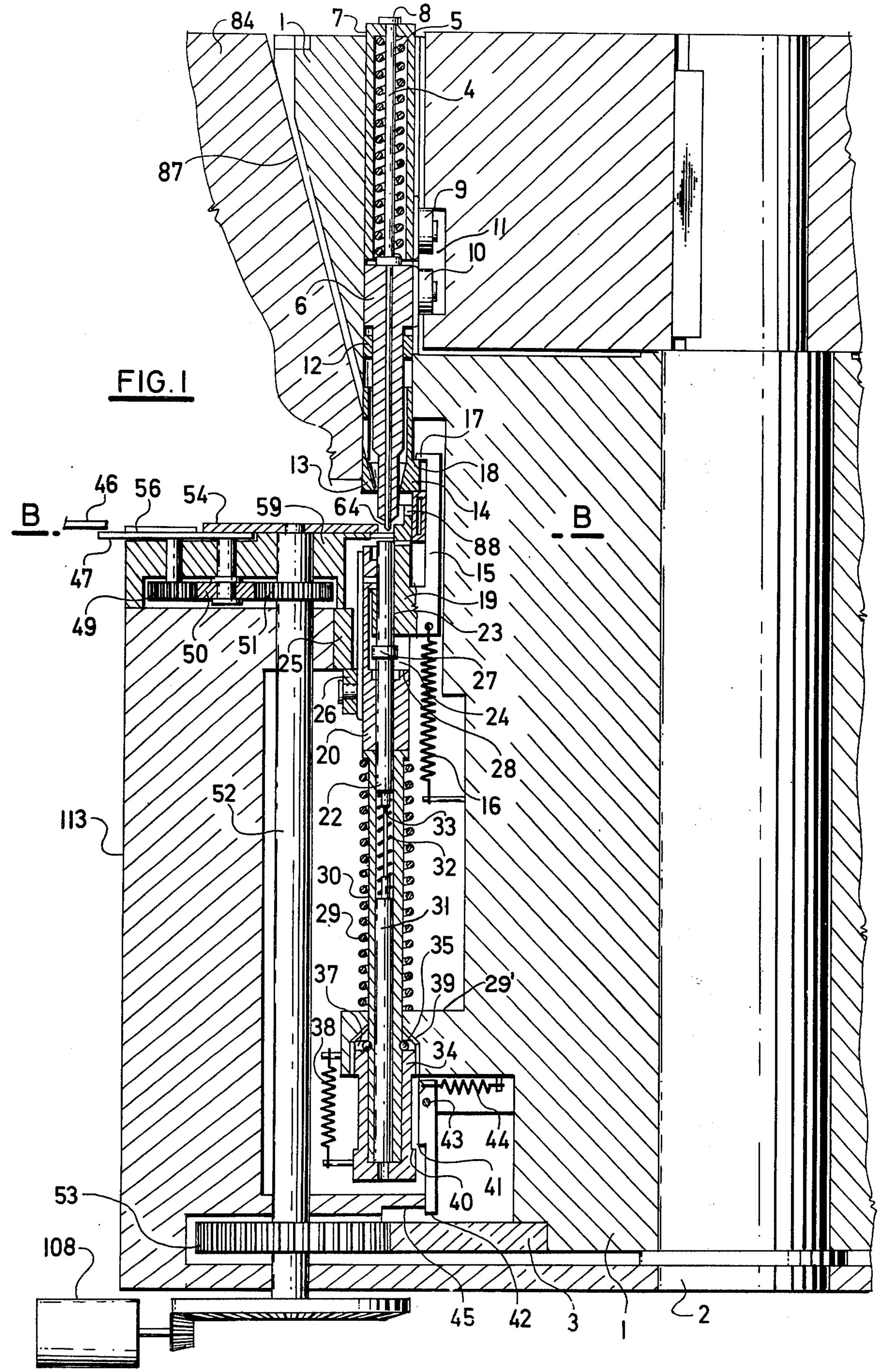
FIG. 1 is a longitudinal sectional elevational through the rotor and the combined tool, the section taken along a plane indicated in FIG. 2 by the line C—C.
Figure 2:
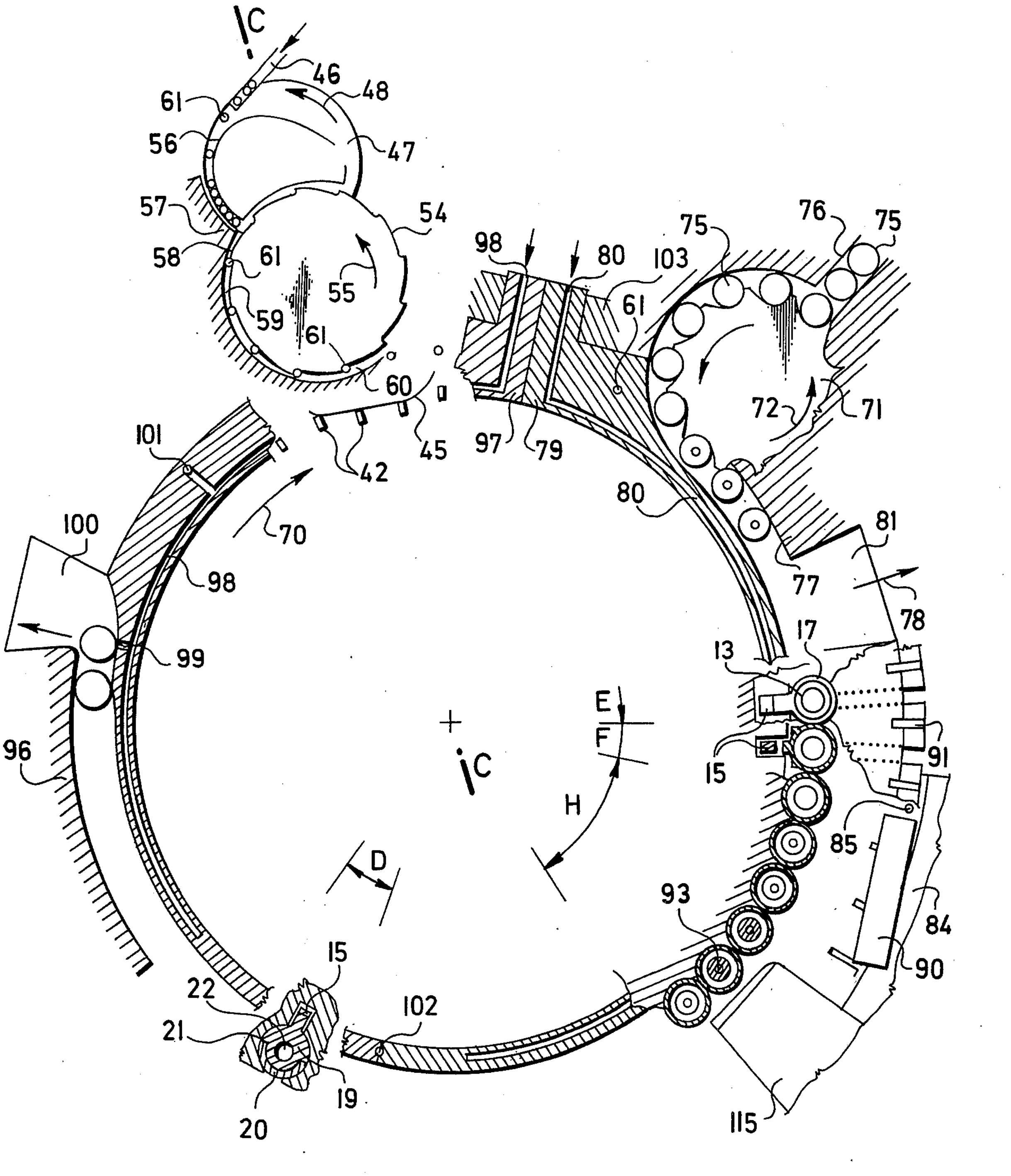
FIG. 2 is a cross section along a plane indicated in FIG. 1 by the line B—B, the sections H, F, E shown thereon corresponding to individual sectors shown in FIG. 10, and sector D corresponding to the section D—D in FIG. 14. A portion of the apparatus at the right, including the waste trough, means for cutting off the downwardly flowing stream of glass, being shown moved to the right as indicated by the arrow 78 away from the rotor for clarity of illustration.

Turning now to FIGS. 1 and 2, the illustrative embodiment of the arrangement of the invention for glazing bases of electric bulbs comprises a rotor 1 continuously rotating around a vertical shaft 2 fixed on the frame 113 of the machine, the rotor being driven by a gear 3 affixed thereto. Mounted upon the rotor 1 and travelling therewith are the plurality of tools having two aligned tool parts. The first, upper part of each of the tools comprises an upper, vertically reciprocable punch 6, the second part of the tool being a receptacle comprising a bore 67 in the bottom 65 of a mold (see FIG. 4).

THE GENERAL ORGANIZATION

Some 48 to 50 combined tools, each of which comprises a support 4 for a glazing needle 64 are uniformly distributed on the pitch circle of the rotor 1, which corresponds to the pitch circle of the gear 3. The support 4 has a head 8 at its upper end. The support 4 is supported by a sliding element 7 and is encompassed by a pressure spring 5 which bears at its upper end against the sliding element 7 and at its lower end against a collar of the glazing needle 64. The sliding element 7 can slide in an opening of the rotor 1, and is provided on the side facing the axis of the arrangement with an upper roller 9 rolling along the upper track of a two-sided cam 11 affixed to shaft 2. A lower roller 10 situated on a vertically reciprocable punch 6 rolls along the lower track of a fixed two-sided cam 11. At a location shown in FIG. 7, the two cam tracks (upper and lower surface of cam 11) are separated by means 69, the lower track being level beyond means 69. The rollers 9 and 10 are urged against the tracks of the two-sided cam 11 by the force of the pressure spring 5. A bearing 12 is fixed on the rotor 1 in the recess therein which receives the punch 6; below bearing 12 a feeler 13 is slidably supported on the punch 6. The punch 6 has an axial bore which houses a glazing needle 64.

Figure 18:
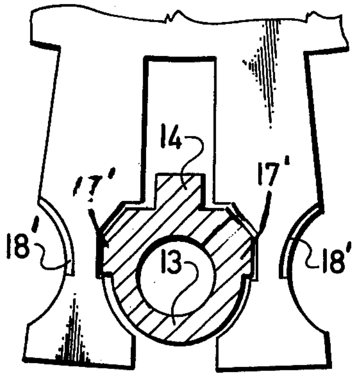
FIG. 18 is a cross sectional view showing on an enlarged scale the feeler with a guiding extension and stops and surfaces provided on the rotor.
Figures 9, 10B:
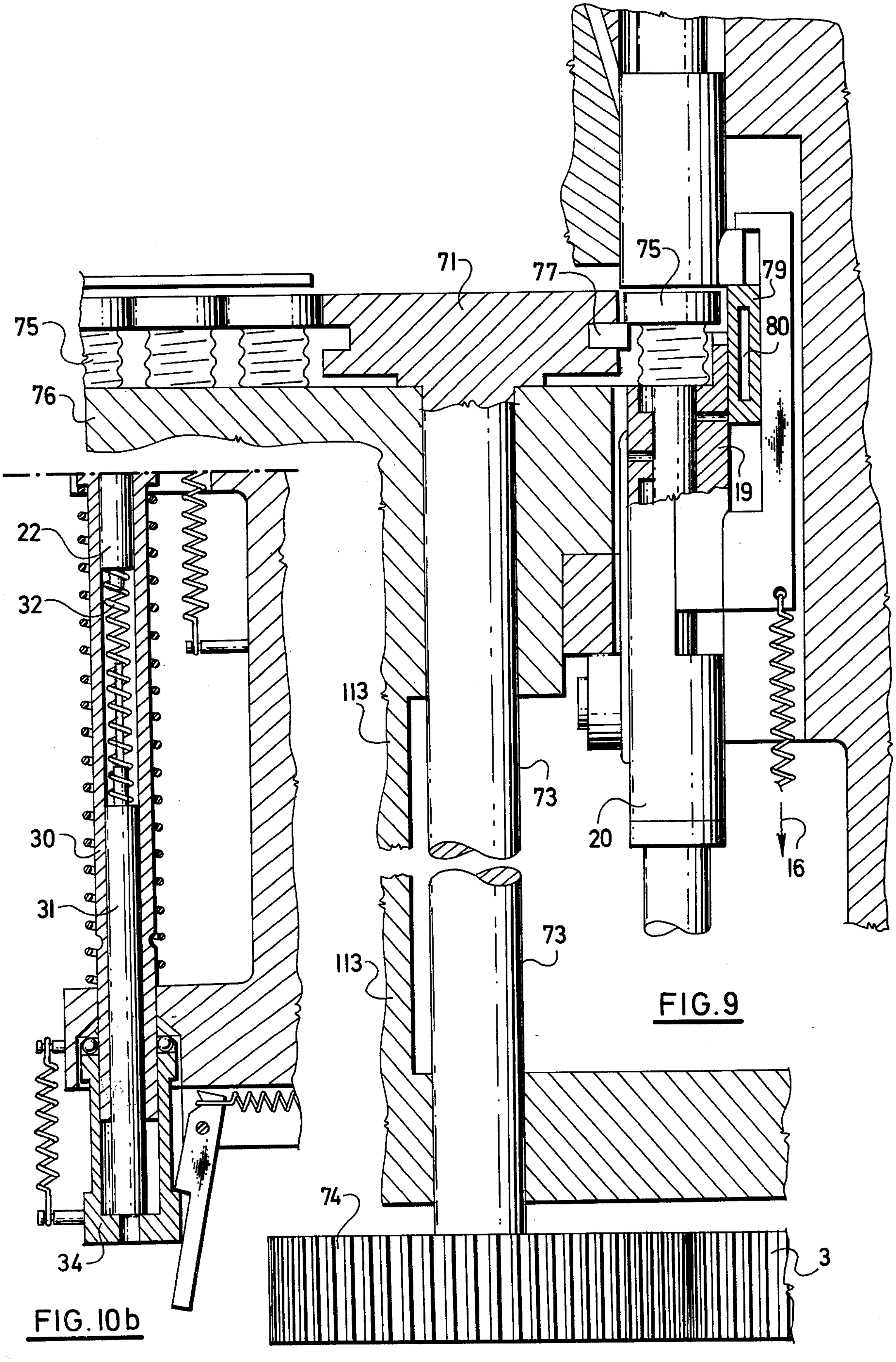
FIG. 9 is a longitudinal sectional view showing the feeding of the sleeve to the combined tool by means of the circular table of the sleeve carrier.
Figure 15:
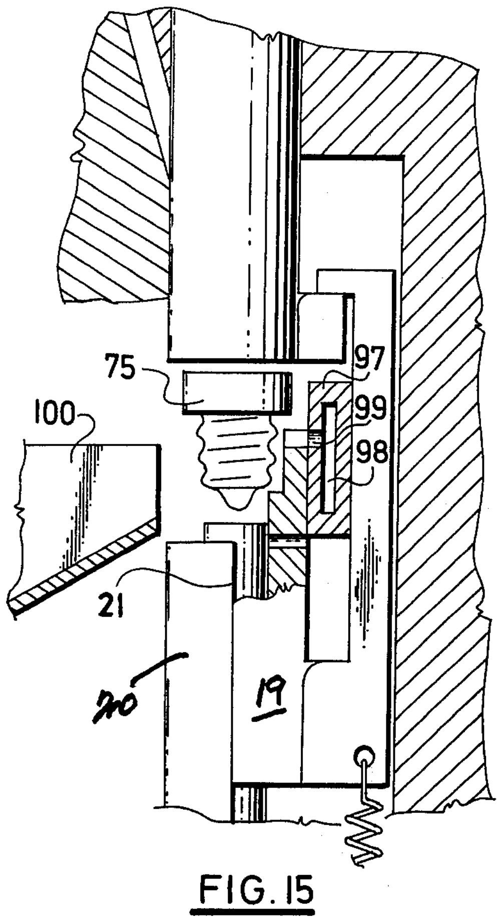
FIG. 15 shows in elevation the expelling of the base by pressure air to the finished base trough.

The feeler 13 has on its side facing the axis of the rotor 1 a vertical guiding land 14 (FIG. 10*a*), the top 18 of which is engaged by part 17 of a control bar 15 which is urged downwardly thereagainst by a coil tension spring 16. The feeler 13 has guiding lands 17' (FIG. 18) engaging guide surfaces 18' on the rotor 1 at the recess in the rotor in which the mold is disposed. The lower end of control bar 15 is integral with the rear part 19 of the mold (FIGS. 1 and 9). The rear (radially inner) part 19 of the mold cooperates with the front part 20 of the mold, the parting plane 21 of the two parts of the mold passes through the axis of the mold axis (see FIG. 15).

Figure 4:
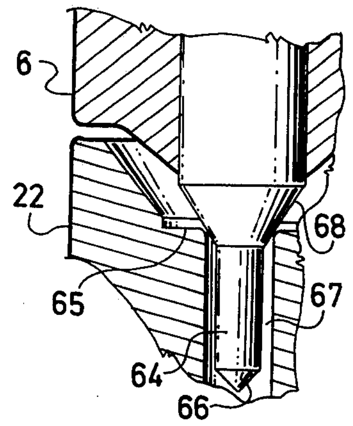
FIG. 4 illustrates on an enlarged scale the working slot between the stud and the punch, no contact being present in the mold.

A stud 22 is disposed coaxially in the front part 20 of the mold, the upper part of the stud 22 forming the bottom surface 65 of the mold (see FIG. 4). The stud 22 passes slidingly along a guide surface 23 in the rear part 19 of the mold and forms both parts 19 and 20 of the mold into a unit by being supported by both such mold parts. The movement of the guiding means 23 is limited by the vertical extent of the recess 24 (FIG. 1) formed in the front part 20 of the mold. The front part 20 of the mold rests at its lower part against the upper end of a tube 30 and is provided on its external side with a roller 26 which engages along a cam 25 fixed on the frame 113 of the apparatus. The roller 26 is urged against the cam 25 by a coil compression spring 29 telescoped over the tube 30, the lower end of spring 29 resting against a surface 29' on the rotor 1.

The lower end of tube 30 passes through a bore in the lower part of rotor 1. The tube 30 has an axial bore, into the upper part of which the stud 22 extends. A lower stud 31 extends into the lower part of the tube 30. The studs 22 and 31 are linked by a coil tension spring 32, which urges them toward each other to a position in which the lower end 33 of stud 22 engages the upper end of stud 31. The lower stud 31 is firmly connected to a circumferential cage 34 which supports balls 35 in recesses in its upper part. The tube 30 is provided with a recess at the location of the balls 35. The circumferential cage 34 is urged against stop surface 36 on the lower end of tube 30 by a coil tension spring 38. The circumferential cage 34, balls 35, and the recess 37 in the tube 30, together with a conical surface 39 in the rotor 1 form a ball catch. An extension 40 is provided on the circumferential cage 34 for cooperation with a dent 41 formed on a rocking pawl 42 supported on a pivot pin 43 fixed on the rotor 1. The rocking pawl 42 is urged against the extension 40 of the cage 34 by a coil tension spring 44 and is actuated in the opposite direction by a cam 45 on the frame 113.

THE FEEDER FOR THE BASES

The rotor 1 supports in its lower part a gear 3 which meshes with another gear 53 affixed to the lower part of a shaft 52 on the upper end of which there is affixed a carrier ring 54, shaft 52 being driven from a motor 108 through gearings schematically indicated in FIG. 1. A gear 51 is fixed on the upper part of the shaft 52, gear 51 meshing with an idler gear 50, meshing in turn with a gear 49 which drives a carrier disc 47 in direction 48 (see FIG. 2). The carrier 54 has recesses 58 on its circumference; opposite the recesses there is provided a fixed rest 59 on a fixed support. A fixed wiper 56 for guiding contacts 61 falling from a trough 46 is disposed above the carrier disc 47. The rest 59 has a groove 60 located on the line connecting the axis of the carrier ring 54 and of the axis of the rotor 1. The gear 3 on the rotor also meshes with a gear 74 on a shaft 73 (FIG. 9) bearing a carrier disc 71 for sleeves 75. The sleeve carrier disc 71 has recesses on its circumference, the recesses cooperating with a fixed part 77 of the frame to feed sleeves 75 as shown in FIG. 2.

THE GLASS FEEDER

Figure 10A:
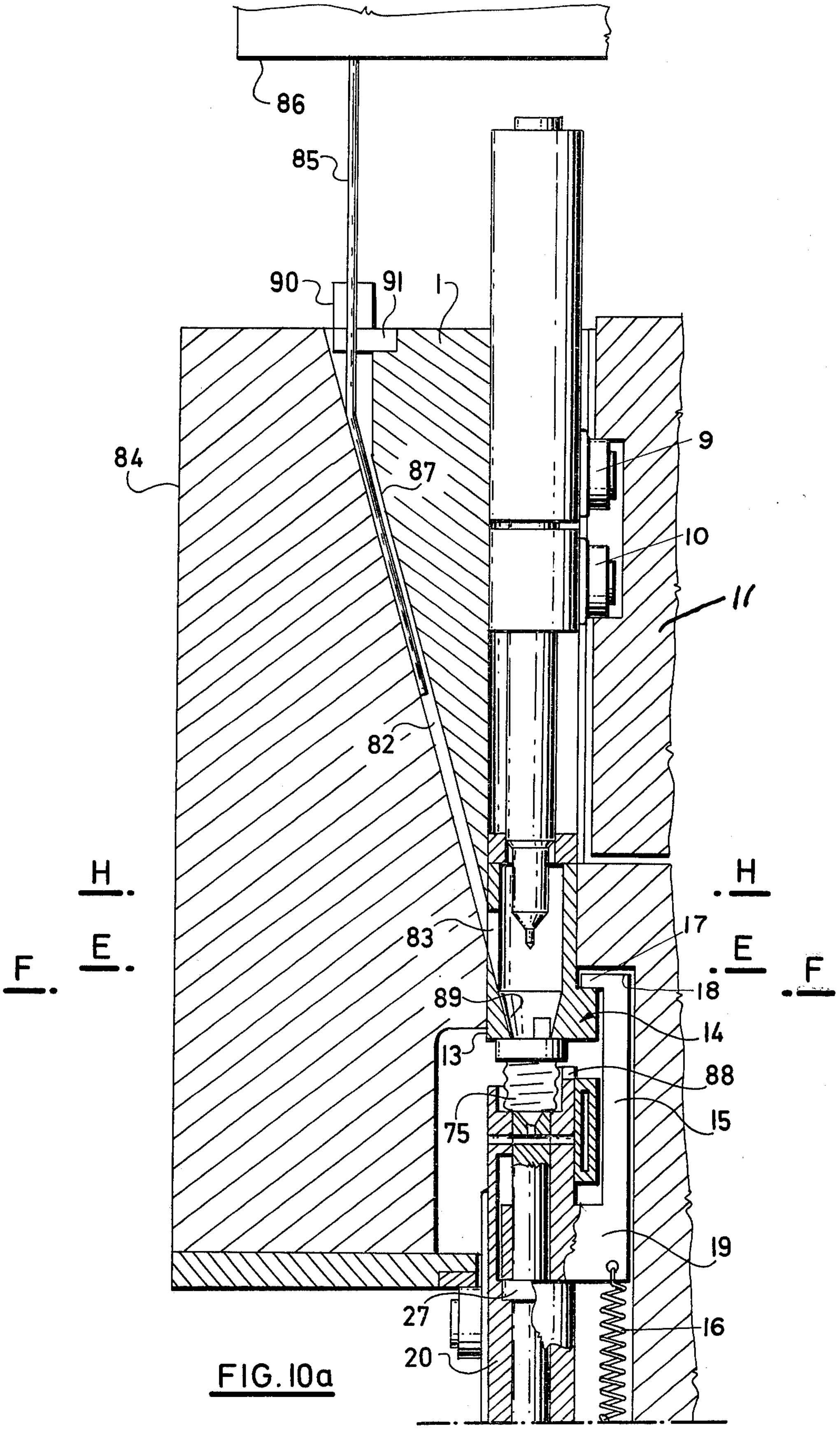
FIGS. 10*a* and 10*b* show the dosing of liquid glass into the mold by the glass supply by way of the throughflow opening in the feeler.
Figure 11:
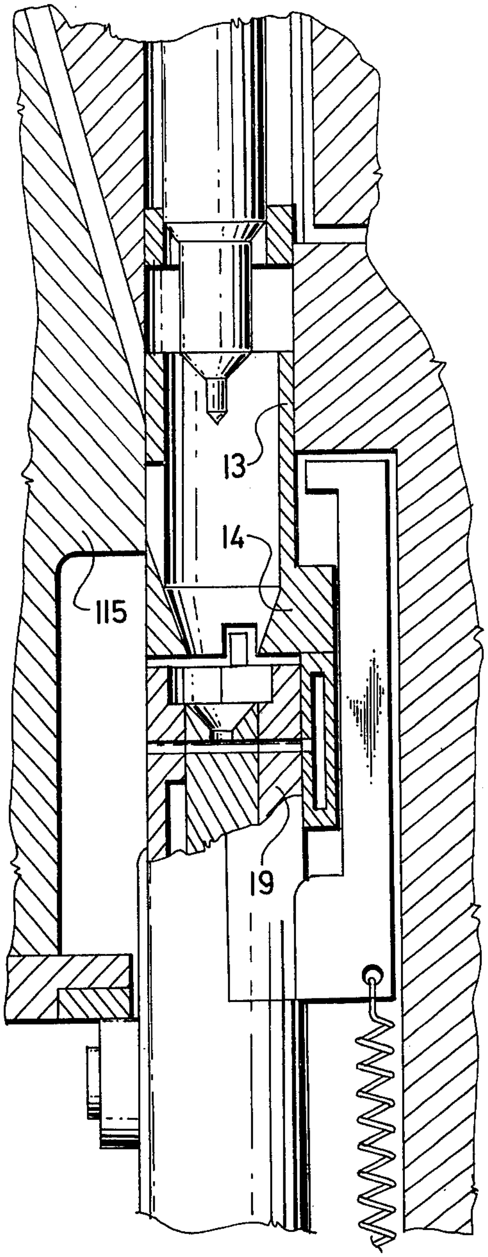
FIG. 11 shows a situation in which no sleeve is present in the course of dosing glass.
Figure 12:
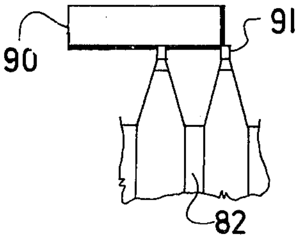
FIG. 12 shows in elevation cutting edges for the molten glass supply rotating with respect to a stationary knife.

At the place of feeding liquid glass the frame 113 is provided with a fixed chute 84 provided in its upper part with a stationary knife 90 (FIG. 10*a*). The chute 84 in its upper part has a conical passage leading to a glass supply channel 82. A melting furnace 86 from which a stream 85 of glass flows, is situated above the conical inlet end of the glass supply channel 82. The glass supply channel 82 is completed by a reverse cone 87 on the outer surface of the rotor 1 (FIG. 10*a*). The glass supply channel 82 terminates at its lower end in a supply opening 83 in the feeler 13. Edges 92 (FIGS. 2, 10*a* and 12) serving for cutting the glass stream 85 are provided on the upper part of the rotor 1, the funnel-shaped upper end of the glass supply 82 channel being disposed between edges 91. The chute 84 is provided in its lower part with a waste chute 115 for glass (see FIGS. 2 and 11). The frame 113 has in its internal part a first air distributor 79 and a second air distributor 97, (FIG. 2) the distributor being connected at their ends by an attachment 102 and fixed against turning by a holder 103 (FIG. 2). The first air distributor 79 has an air channel 80, terminating in an air nozzle 94 (FIG. 13), by means of which compressed air is blown through a transverse opening 95 in the front part 20 of the mold, such air passing through the rear part 19 of the mold and through the stud 22 when the mold is closed. The second air distributor 97 has an air channel 98 which communicates with an ejecting nozzle 99 and a cleaning nozzle 101 (FIG. 2). The frame 113 is provided on its circumference with a curved abutting bar 96 terminating in a discharge trough 100 which receives the glazed bases of electric bulbs.

Figure 16:
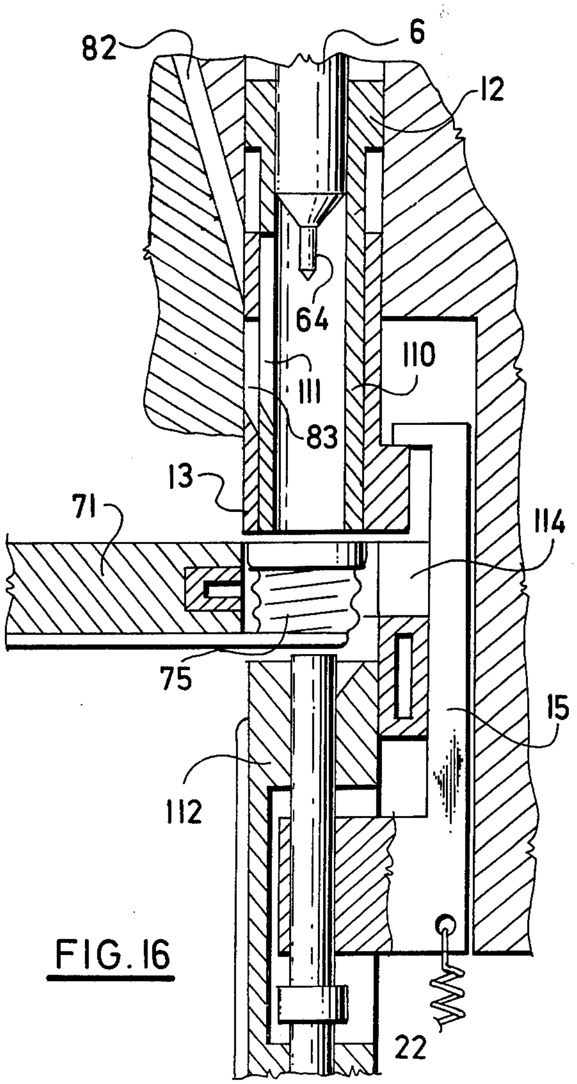
FIG. 16 is a sectional elevation showing the placing a sleeve on a seat formed in the rotor.
Figure 17:
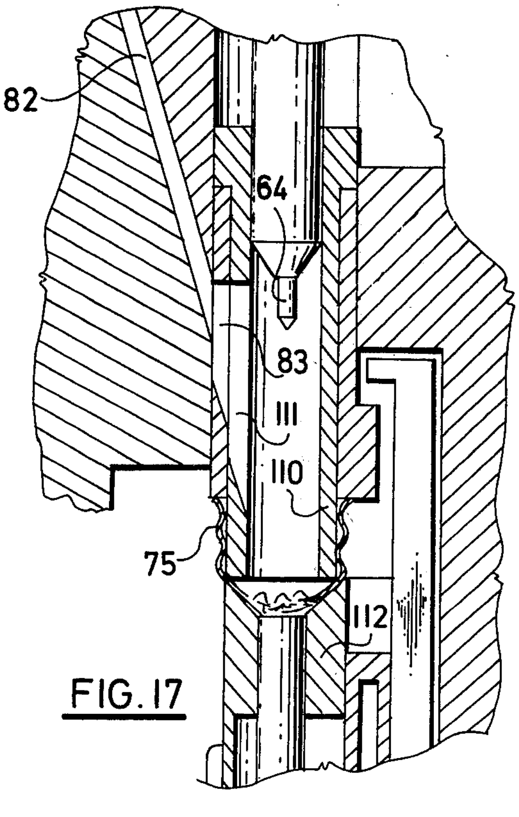
FIG. 17 shows in elevation the protection from hot glass of threads of the sleeve by a protecting tube.

If it is necessary to protect the thread on the base from hot glass in the course of glazing the base, or if the glass is to be supplied solely to the center of the base, then the bearing 12 is provided with a protecting tube 110 with which it forms a unit (see FIGS. 16, 17). The punch 6 moves in the protecting tube 110 within which it fits snugly. The feeler 13 is disposed outside tube 110. A supply opening 83 is arranged in the feeler 13, with a channel 111 in the protecting tube 110 opposite to opening 83. In this case, the mold 112 consists, not of separate front and rear parts 20, 19, but is formed as one unit and the sleeve 75 is received in a seat 114 in the rotor 1.

THE MANNER OF OPERATION OF THE APPARATUS

Figure 3:
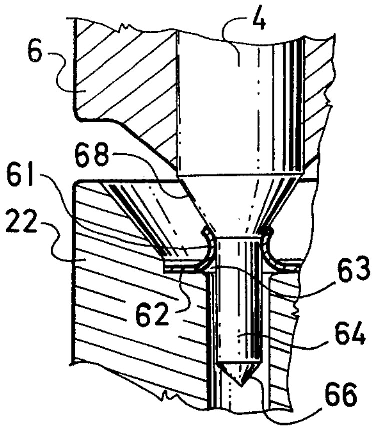
FIG. 3 illustrates on an enlarged scale the punch with its support in its working position with a contact present in the mold.

The rotor 1 continuously rotates around the fixed shaft 2 and carries on its circumference some 48 to 50 combined tools. The rotor 1 is driven from the motor 108 through gears 53 and 3. The carrier ring 54 is rotated by way of the shaft 52 and the gears 51 and 50; the carrier disc 47 is driven in the direction of the arrow 48. Contacts 61 for the electric bases are taken along by the carrier disc 47 and are urged to its circumference by the wiper 56, thereby entering the channel formed by the wiper 56 and the fixed rest 57. The bottom of such channel is formed by the carrier disc 47. Thus there is formed a continuously replaced row of contacts 61 in this channel. The contacts 61 are subsequently withdrawn by recesses 58 which are uniformly spaced along the circumference of the carrier ring 54. The contacts 61 are maintained in the recesses 58 by the fixed rests 57 and 59 along which they sliding upon their bearing surface 62 (FIG. 3). When a contact 61 reaches the line connecting the axis of rotor 1 and the carrier ring 54, (the start of a first station) the glazing needle 64 situated on the support 4 enters the opening in the contact 61 by the action of the two-sided cam 11 (FIG. 3). By the action of the cam groove 60 and the roller 9, upon further rotation of the rotor 1 the glazing needle 64 subsequently moves further downwardly until, at the end of the first station, its point 66 finally reaches the bottom 65 of the mold formed by the upper part of the stud 22 (FIG. 4). The contact 61 now loses its support of the rest 59 and falls along the glazing needle 64 to the bottom 65 of the mold. The downward movement of the glazing needle 64 continues until it enters the bore 67 in the bottom 65 of the mold, at which point the contact 61 still does not reach the press surface 68 on the support 4 of the glazing needle 64. At the same time, the stud 22, together with the front part 20 of the mold by the action of the spring, 29 associated with the tube 30, moves upwardly as permitted the cam 25 and roller 26. Prior to this movement, the lower cam 45 thrusts the lower end of the rocking pawl 42 to the right (FIG. 1) so that the dent 41 of the pawl is disengaged from the extension 40 of the cage 34.

When the contact 61 is at the bottom 65 of the mold in the course of upward movement of the stud 22, it comes into contact with the conical press surface 68 of the support 4 (FIG. 3) and prevents any further movement of the stud 22 and thus also of the cage 34 during the course of the further movement of the front part 20 of the mold. If no contact 61 is present at the bottom 65 of the mold, a condition shown in FIG. 4, due to the action of the spring 38 the stud 22 follows the movement of the front part 20 of the mold up to the position shown in FIG. 4. At this moment the lower cam 45 releases the rocking pawl 42. As above explained, if the contact 61 is present as shown in FIG. 3 the dent 41 of the pawl comes in engagement with the extension 40 of the cage.

Figure 5:
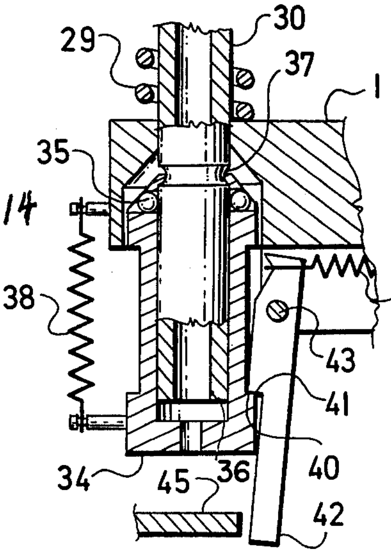
FIG. 5 shows on an enlarged scale the operation of a rocking pawl.
Figure 6:
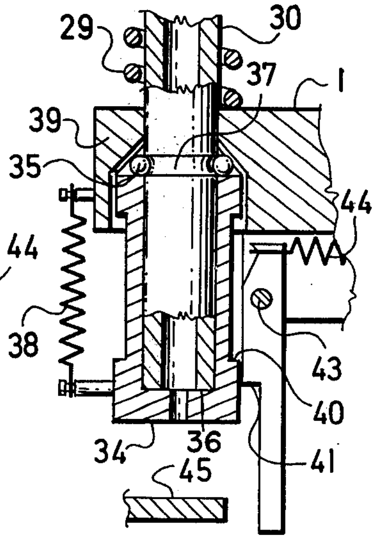
FIG. 6 shows on an enlarged scale the operation of the ball catch.

If no contact 61 is present, the dent 41 does not engage the extension 40 and assumes the position shown in FIG. 6. In case a contact 61 is present, the cage 34 does not permit the further upward movement of the front part 20 of the mold. Together with the front part 20 of the mold, the tube 30, due to the action of its spring 29, moves upwardly, whereby the recess 37 moves upwardly beyond the level of the balls 35 supported in the cage 34, as shown in FIG. 5.

If no contact 61 is present, the cage 34 moves upwardly together with the front part 20 of the mold and of the tube 30 until the balls 35 touch the cone 39 (FIG. 6), which presses the balls 35 into the recess 37 of the tube 30 and thus prevents the tubular extension 30 and the front part 20 of the mold from proceeding in the upward movement and thus prevents the closing of the shaping mold 112 in the course of the whole further course of the revolution of the rotor.

Figure 7:
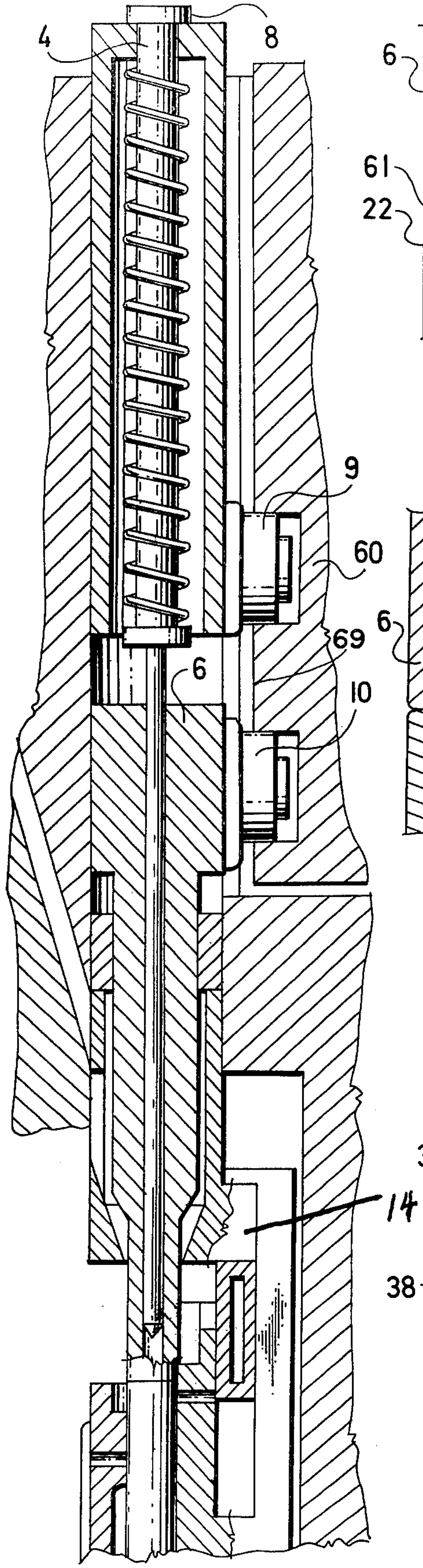
FIG. 7 shows in section on an enlarged scale the two-sided cam engaging with an upper and a lower roller.
Figure 8:
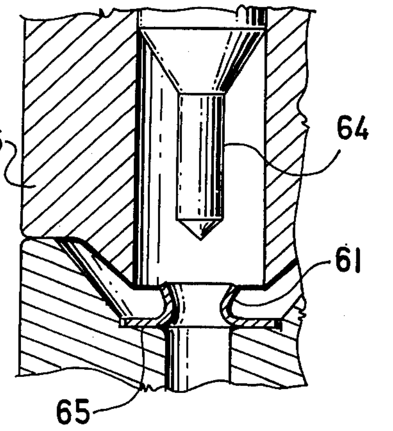
FIG. 8 illustrates on an enlarged scale the contact wiped off from the glazing needle to the bottom of the mold.

After the described detection of the presence of a contact 61 on the bottom 65 of the mold, the front part 20 of the mold temporarily ceases its upward movement, so that the shaping mold 112 remains open. The support 4 for the glazing needle 64 starts its upward movement so that the upper roller 9 comes to the track-dividing means 69 of the cam (FIG. 7) which divides the two-sided cam 11 into two separate tracks, whereby the lower roller 10 and thus also the punch 6 remain on the same level. The upper cam track rises beyond means 69, so that the roller 9 raises the sliding element 7 which raises the support 4 by means of the shoulder 8, so that it moves relatively with respect to the punch (FIG. 7)

and wipes the contact 61 from the glazing needle 64 to the bottom 65 of the mold as shown in FIG. 8.

By the continuous rotating motion of the rotor 1 in the direction of the arrow 70 in FIG. 2 the shaping molds 112 with inserted contacts 61 are brought to the disc 71 which carries sleeves for the bases; disc 71 is rotated in the direction of the arrow 72 by shaft 73 and the gear 74 driven by the gear 3 on the rotor 1. The carrier disc 71 receives the sleeves 75 from the sleeve guide 76 through which they are pushed under moderate pressure. At the line connecting the axis of rotor 1 and the axis of the carrier disc 71, (a second station), each sleeve 75 is inserted into the rear part 19 of the mold, which thus far has performed no motion in the vertical direction.

The feeding of the sleeves 75 to the rear mold part 19 is performed by the action of the fixed bar 77 which guides the sleeve 75 into a recess in the rear part 19 of the mold. Subsequently the front part 20 of the mold starts to move upwardly and thus closes the shaping mold 112, thereby preventing the sleeve 75 from falling out of the mold. The above-described movement of the front part of the mold assumes that a contact 61 is present in the shaping mold 112.

If no contact 61 is present in the mold, the front part 20 of the mold does not perform this movement, and the shaping mold 112 remains open at its radially outer side, and at the end of the fixed bar 77 the sleeve 75 is expelled from the front part of the mold to the waste trough 81 by air supplied via the air distributor 79 from the air channel 80 to the ejecting nozzle 99 from the seat of the shaping mold 112 to the waste trough 81 along the path 78 (FIG. 2). In case the shaping mold 112 is closed, no such expelling of the sleeve 75 takes place.

In the course of the further turning of the rotor 1, if a contact 61 is present in the mold, the movement of the front part 20 of the mold proceeds, the shaping mold 112 is closed, the rear part 19 of the mold is connected to the front part 20 of the mold, and is taken along upwardly therewith as shown in FIG. **10*a*. If a sleeve 75 is present in the mold, the feeler 13 is raised by the sleeve 75 and adjusts its glass supply opening 83 opposite the glass supply 82, which with the fixed chute 84, at a third station, forms a channel for supplying the glass stream continuously pouring out of the molten glass supply 86, such as a melting furnace. The glass supplies 82 are formed one by one for each working section of the rotor on the reverse cone or funnel 87 on the rotor 1. This arrangement enables the glass stream 85 to slide along the chute 84 and to be subsequently guided by the glass supply channel 82 to the supply opening 83 of the feeler 13 and via its funnel 89 to the shaping mold 112. It simultaneously insures that after reaching the end of the chute 84 the glass remaining in the glass supply 82 falls into the glass waste trough 115**.

If no sleeve 75 is present when raising the complete mold (FIG. 11) the feeler 13 is not raised by the sleeve 75; for this purpose there is provided an arrangement whereby the guiding means 14 for the feeler 13 enters a recess 88 of the mold. This takes place if an empty shaping mold 112 in the course of its movement has also raised the feeler 13. If the feeler 13 has not been raised, the supply opening 83 does not come opposite to the glass supply 82 and thus prevents any flow of glass into the shaping mold 112, and the glass at the end of the chute 84 then falls from the glass supply to the waste trough 115. In the course of movement of the shaping mold 112 the internal spring 32 pulls the stud 22 and the collar 27 toward the front part 20 of the mold.

The dosing of glass is performed by cutting the continuously flowing glass stream 85 by a stationary knife 90 against rotating edges on the rotor, such edges 91 being arranged between working sections of the apparatus.

After the dosing of glass into the shaping mold 112 by the action of the two-sided cam 11 (FIG. 13) the punch 6 and the sliding element 7 move downwardly until the punch 6 enters the dosed glass, which it presses to the required shape. The pressing force is determined by the force of the pressure spring 5 acting on the punch 6 via the support 4. Excess allowances of the dosed glass are compensated by a clearance 92 (FIG. 13) between the punch 6 and the resiliently pressed sliding element 7 so that in case of an increase of the glass dose this clearance is reduced. In the course of pressing the glass, the lower roller 10 does not bear on the two-sided cam 11 and the whole force of the pressure spring 5 performs the pressing of the glass.

In case of an excessive glass dose wherein the clearance 92 is unable to compensate for this dose, the punch 6 and the sliding element 7 come in contact and the press force overcomes the force of the spring 29 acting upon the tube 30 and the shaping mold 112 is pressed downwards. This prevents damage to the apparatus in the course of the pressing operation.

The pressing is performed at the station 93 (see FIG. 2), the course of the pressing being governed by the contour of the two-sided cam 11.

Figure 13:
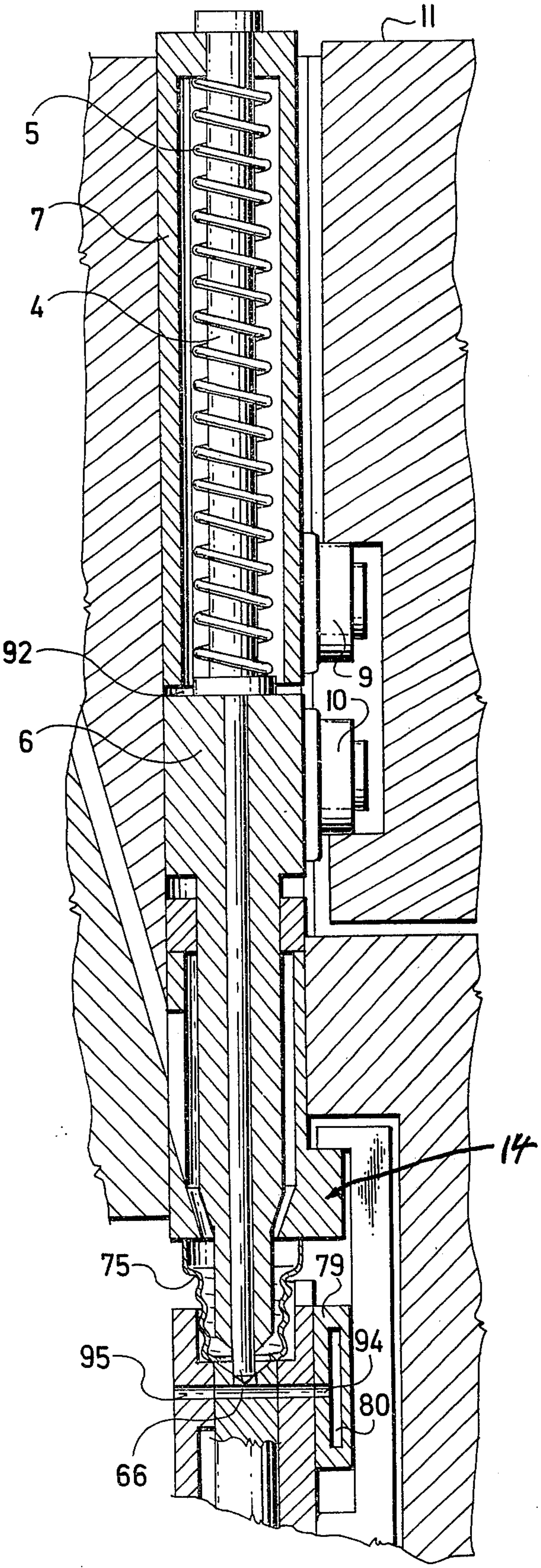
FIG. 13 shows the operating position of the punch when pressing the liquid glass in the mold in the presence of a sleeve and a contact.

It is advantageous to provide pressing station 93 with a device for blowing off glass particles, which frequently remain sticking to the point 66 of the glazing needle 64. Such removal of glass particles is effected by blowing air from the air channel 80 of the first air distributor 79 through the air nozzle 94 and through the transverse opening 95 in the front part 20 of the mold (FIG. 13).

After finishing the pressing of glass, the punch 6 and the sliding element 7 move upwardly in the course of the further continuous turning of the rotor 1, whereby an additional wiping of the glazing needle 64 to rid it of sticking small amounts of glass or of a contact 61 takes place (FIGS. 7, 8).

Figure 14:
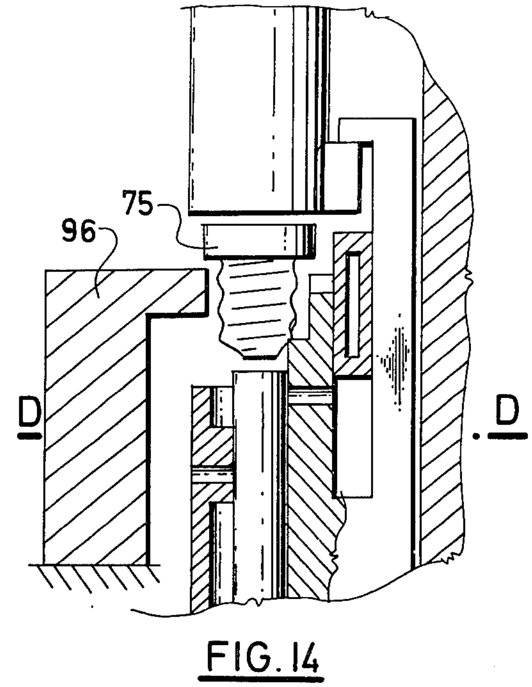
FIG. 14 shows in elevation the arrangement of a fixed abutting bar which prevents the finished base from falling out of the mold.

After the punch 6 has been removed, a subsequent lowering of the shaping mold 112 and of the feeler 13 to the surface 18 takes place by the action of the cam 25. In the course of the further action of cam 25 in the downward direction, the rear part 19 of the mold remains suspended by its control bar 15 on the guiding means 14 of the feeler 13, whereas the front part 20 of the mold moves downwardly, whereby the shaping mold 112 is opened (FIG. 1). In order to prevent the falling out of the finished base of the bulb from the open mold, the fixed curved abutting bar 96 (FIGS. 1, 14) is provided radially outwardly of the rotor and coaxial therewith, which ends at the place the finished base is expelled from the working section. The expelling is performed by air from the air distributor 97 through an ejecting nozzle 99 FIG. 15) so that the air stream expels the finished base to the base discharge trough. A nozzle 101 (FIG. 2) cleans the mold by pressure air is connected to the air distributor 97.

Although the invention is illustrated and described with reference to one preferred embodiment thereof, it is to be expressly understood that it is in no way limited to the disclosure of such a preferred embodiment, but is capable of numerous modifications within the scope of the appended claims.

What is claimed is:

1. Apparatus for glazing the bases of electric bulbs, comprising a frame, a rotor supported on the frame for rotation about an axis, driving means for continuously rotating the rotor, a plurality of angularly spaced combined tools for glazing bases carried by the rotor along its circumference, each tool being composed of a first part and a second part aligned therewith, the first part of the tool comprising a punch mounted for reciprocation toward and away from the second part of the tool, the second part of the tool comprising receptacle means for receiving a sleeve and a contact for a base, means for feeding a contact to each of the receptacle means while the receptacle means is moving with the rotor; means for feeding a sleeve to each of the receptacle means containing a contact while such receptacle means is moving with the rotor and for assembling such sleeve with the contact, means for feeding molten glass to the interior of the sleeve thus assembled with the contact in the receptacle means, and means for thereafter thrusting a punch while moving with the rotor toward the second part of the tool to shape the glass deposited in the assembly.

2. Apparatus as claimed in claim 1, wherein the rotor rotates about a vertical axis, the first part of the tool is disposed above the second part of the tool, the punch reciprocates vertically, the sleeve in the assembly of the sleeve and contact in the receptacle means is disposed open end up, and the glass is fed downwardly into the open upper end of the assembly.

3. Apparatus as claimed in claim 2, wherein the means for feeding contacts to the receptacles moving therepast is disposed at a first station, the means for feeding sleeves to the receptacles moving therepast is disposed at a second station downstream of the first station, and the means for feeding glass to the assemblies of a contact with a sleeve in the receptacles is disposed at a third station downstream of the second station.

4. Apparatus as claimed in claim 3, comprising means disposed between the second and third stations for ejecting a sleeve from any receptacle which does not contain a contact.

5. Apparatus as claimed in claim 4, comprising means for preventing the feeding of glass to any receptacle which does not contain a sleeve.

6. Apparatus as claimed in claim 1, wherein the receptacle forms a first half of a mold, and comprising a second half of the mold, the two halves of the mold mating along a parting plane containing the axis of the punch, means for mounting each of the two halves of the mold for reciprocation along said parting plane, means for advancing the first half of the mold into its contact and sleeve receiving position in which it is open on one side while leaving the second part of the mold in a retracted position, and means to advance the second mold part into mating relationship with the first mold part after the first mold part has received a contact and a sleeve.

7. Apparatus as claimed in claim 6, comprising means for preventing the advance of the second mold part into mating relationship with the first mold part when either a contact or a sleeve is absent from the first mold part.

8. Apparatus as claimed in claim 7, comprising means for ejecting a sleeve from any first mold part which does not contain a contact, said ejecting means comprising means providing a jet of air directed against said sleeve in a direction toward the then open side of the first mold part to blow the sleeve out of the first mold part through the open side thereof.

9. Apparatus as claimed in claim 8, comprising means disposed downstream of the location at which glass is fed to the assembly and shaped by the punch for ejecting the completed assembly from the mold.

10. Apparatus as claimed in claim 9, wherein the assembly ejecting means comprises means for retracting the second half of the mold and means for directing a jet of air against the assembly to remove it from the first half of the mold.

* * * * *